United States Patent [19]

Souza

[11] Patent Number: 4,476,021

[45] Date of Patent: Oct. 9, 1984

[54] RUSE, SCALE AND FOREIGN PARTICLE ARRESTER

[76] Inventor: Alexander Souza, 689-C Puuloa Rd., Honolulu, Hi.

[21] Appl. No.: 391,021

[22] Filed: Jun. 22, 1982

[51] Int. Cl.³ .............................................. B01D 29/36
[52] U.S. Cl. ..................................... 210/307; 210/320; 210/335
[58] Field of Search ............... 210/155, 162, 335, 447, 210/446, 305, 307, 320, 336, 168, 167, 521; 123/41.15, 41.01

[56] References Cited

U.S. PATENT DOCUMENTS

| | | | |
|---|---|---|---|
| 97,160 | 11/1869 | Burleigh | 210/447 |
| 1,055,744 | 3/1913 | Hans | 210/305 |
| 1,075,576 | 10/1913 | Kadow | 210/305 |
| 1,496,771 | 6/1924 | Cash | 210/305 |
| 1,568,126 | 1/1926 | Bassett | 210/305 |
| 1,573,929 | 2/1926 | Gall | 210/447 |
| 1,595,983 | 8/1926 | Armstrong | 210/305 |
| 1,632,699 | 6/1927 | Denney | 210/305 |
| 1,961,498 | 6/1934 | Krueger | 210/305 |
| 3,362,534 | 1/1968 | Kay | 210/305 |
| 3,374,894 | 3/1968 | Webster | 210/320 |
| 3,517,815 | 6/1970 | Bolton et al. | 210/521 |
| 3,756,410 | 9/1973 | Moody et al. | 210/305 |
| 3,782,557 | 1/1974 | Pielkenrood | 210/521 |
| 3,834,539 | 9/1974 | Thompson | 210/447 |
| 3,837,494 | 9/1974 | Stevenson | 210/305 |
| 4,124,511 | 11/1978 | Lay | 210/447 |

Primary Examiner—Richard V. Fisher
Assistant Examiner—Wanda L. Millard
Attorney, Agent, or Firm—James Creighton Wray

[57] ABSTRACT

A rust and scale arrester intended for use in heat transfer systems particularly for water cooling systems of internal combustion engines is mounted in place of an ordinary connection hose. Primary and secondary filter deflector screens are mounted at about 60° to the flow of water from the inlet to the outlet. The primary filter deflector screen extends downward into the collection chamber and extends rearward to cause solid particles to flow outward along walls of the collection chamber. The downward extension has a forward and downward extending portion which encourages solid particles flowing downward from the first deflection screen to flow along walls of the collection chamber. The forward portion of the downward extension has openings which allow upward water flow, and the downward and rearward extending portion has openings which allow water to flow over the downward and forward extending portion to remove particles and promote water flow.

11 Claims, 1 Drawing Figure

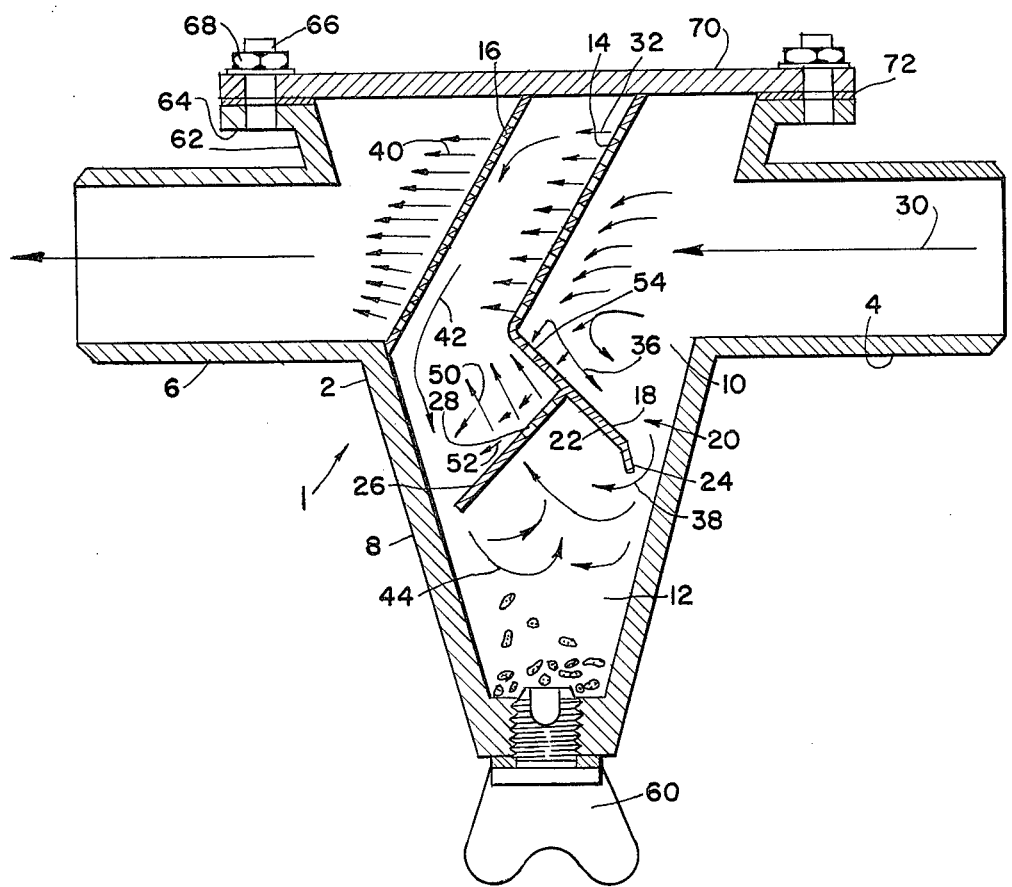

RUST, SCALE AND FOREIGN PARTICLE ARRESTER

BACKGROUND OF THE INVENTION

The present invention provides rust and scale arresting in fluid systems, particularly heat transfer systems and particularly in water cooling systems for internal combustion engines.

Traps for removing solid particles such as rust and scale from water cooling systems are well known. Examples of such systems are found in the following U.S. Pat. Nos.

| 1,857,606 | 1,742,281 |
| 3,362,534 | 2,722,316 |
| 3,834,539 | 1,987,847 |

U.S. Pat. No. 3,834,539 has a metallic plug in a screw-in collection cylinder which is topped by the sloping screen.

U.S. Pat. No. 2,722,316 has a truncated conical cylinder in a large canister. Water flows from plural inlets into the filter and out through plural outlets.

U.S. Pat. No. 1,987,847 has a depending filter canister with a deflector which flows a lower portion of water down into the canister and then back to the radiator or engine.

U.S. Pat. No. 1,857,606 has a flat filter screen, a collection bowl, and a flap to seal off the collection bowl so that it may be removed.

U.S. Pat. No. 1,742,281 has an elongated collection chamber with a series of foraminous plates with solid bottoms to collect particles in riffles.

U.S. Pat. No. 3,362,534 has a separator to remove water from diesel fuel. A suspension is caused to flow downward along a curved and ruff plate to promote water droplet agglomeration.

One of the problems that exists in devices of the prior art is that in water cooling systems it is extremely important that the filters remain open so that flow through the cooling system is not restricted. If the filters become clogged with the particles which they are intended to filter, the purpose of the filter in preventing clogging of the system and overheating of the engine which it cools is defeated.

SUMMARY OF THE INVENTION

The present invention solves the problems of the prior art by providing self-cleaning filters in which the water flow is controlled so that particles will always flow to the bottom and in which water flow is controlled so that the deflector screens will be continuously cleaned and so that particles removed from the screen will be continuously washed from the screens and washed from the deflectors and urged toward the bottom of the collector.

The present invention provides ready access to the filter deflector screens and to baffles associated therewith for insuring their cleanliness and non-obstructiveness.

The present invention consolidates and provides ready removing and cleaning of the collection chamber. The present invention provides complete visual access to the separation and collection chamber to observe the effectiveness of its operation and to observe the condition of the filter deflecter screens and the collection chamber.

The invention is particularly suited for the automotive industry. It is a preventative unit beneficial to automotive and internal combustion engines and any mode of equipment that is water cooled. The primary function of this system is to collect and retain rust and foreign particles accumulated within the cooling system that would otherwise clog the system, particularly the radiator, causing overheating problems that lead to major engine breakdowns. In a preferred embodiment the apparatus of the present invention is constructed of a strong transparent material which is suited to withstand pressure and heat.

The rust and scale arrester of the present invention has two filters. The primary filter deflector screen collects rust and foreign particles. The secondary filter deflector screen collects remaining minute rust and foreign particles and finalizes the filter system.

Both the primary and secondary filter deflector screens allow water to flow directly through the filters. A part of the water is angled downward by the deflector screens at approximately 60° to the direction of flow, pulling along trapped particles into the rust and particle trapping eddy chamber. A portion of the water flows through holes in the angled bottom of the primary deflector screen to equalize the downward water force in both primary and secondary filter screen deflectors. The second filter screen deflector is designed to project remaining minute particles downward and into the trapping eddy chamber for recirculation and repetition of the filtering process by flowing through return holes in the upper portion of the trapping chamber divider. Due to the unique design of the primary filter deflector screen and the lower trapping chamber divider, both filter screens remain self-cleaning and clog-free.

A mounting plate is connected to a large mounting flange on an upward extension of the assembly to provide direct access to the primary and secondary deflector filter screens.

In one embodiment of the invention, the screens may be permanently mounted in the separator chamber of the assembly. In a preferred embodiment the primary and secondary filter deflector screens are attached to the mounting plate so that they are withdrawn from the separation chamber and collection chamber when the mounting plate is raised.

Varied sized units are installed in any convenient location in an engine compartment. Special hoses can be customized and attached to accommodate the unit. One ordinary length of hose can be divided into three sections with the middle section removed and replaced by the rust and scale arrester of the present invention. Inlet and outlet necks can be angled or can be straight to be accommodated in the space available.

A rust and scale arrester apparatus has a fluid inlet and a fluid outlet, a separation chamber positioned between the fluid inlet and the fluid outlet and a collection chamber connected below the separation chamber. A filter in the separation chamber between the fluid inlet and the fluid outlet separates solids from the fluid flowing through the separation chamber. A baffle mounted in the separation chamber and in the collection chamber directs flow of fluid through the separation chamber and through the collection chamber to promote removal of solid particles from the filter and to flow solid particles from the filter into the collection chamber. A plug at the bottom of the collection chamber empties solid particles from the collection chamber.

In a preferred embodiment the baffle is connected to the filter and extends from the filter into the collection chamber.

Preferably, the baffle extends rearward in the direction of the fluid inlet and downward in the direction of the collection chamber from the filter. A portion of the baffle extends forward in the direction of the outlet and downward.

The downward and forward extending portion of the baffle has openings for permitting upward flow of fluid from the collection chamber toward the separation chamber.

The downward and rearward extending portion of the baffle has openings for flowing fluid through the openings from an inlet direction across the downward and forward extending portion of the baffle.

The filter extends downward in a direction of the collection chamber and forward in a direction of the outlet.

The filter has parallel downward and forward sloping foraminous filter barriers. A first filter in a direction of the inlet has relatively large openings and a second filter in the direction of the outlet has relatively small openings. Fluid flowing through the first filter flows through the second filter and tends to flow downward and forward along the second filter thereby pushing solid particles downward toward the collection chamber. The second filter extends across the separation chamber, separating the separation chamber from the outlet.

The inlet and outlet are generally tubular and are axially aligned. The collection chamber is conical and slopes downward and inward. An upward extension opposite the collection chamber has an outward extending flange. A mounting plate covers the flange and seals the apparatus. Removing the mounting plate provides access to the filter and baffle.

These and other further features and objects of the invention are apparent in the disclosure which is the drawing in the specification which includes the above and ongoing description and the claims.

BRIEF DESCRIPTION OF THE DRAWINGS

The sole figure of drawings show a sectional view of a preferred embodiment of the rust and scale arrester of the present

DETAILED DESCRIPTION OF THE DRAWINGS

A rust and scale arrester is generally indicated by the numeral 1. The arrester has a body 2 with an inlet 4 and outlet 6. The body 2 has a generally conically-shaped center portion 8 between the cylindrical tubular inlet and outlet portions 4 and 6.

The conical portion 8 provides a separation chamber 10 and a rust trapping eddy chamber 12 which is a collection chamber. Primary and secondary filter deflector screens 14 and 16 are positioned in the separation chamber 10. The primary filter deflection screen 14 has a lower portion 18 which forms a baffle means generally indicated by the numeral 20. The baffle means 20 has a downward and rearward extending portion 22 which is curved downward at its rearward position 24 to promote eddy flow and to direct rust and particles to the rust-trapping eddy chamber 12.

A forward portion 26 of the baffle means has openings 28 which promote upward flow of fluid from the eddy chamber and which promote the eddys which deposit the rust at the bottom of the chamber.

Fluid flows generally in the direction of arrow 30 and flows through openings in the primary filter deflector screen 14 as indicated by parallel arrows 32. A portion of the fluid indicated by arrows 34 turns downward and flows downward along the screen scrubbing the primary filter deflector screen of rust and other particles. Most of the fluid turned downward by the filter screen flows downward as indicated by the arrow 36 along the rearward portion 22 of the baffle. That fluid flows through the gap as indicated by the arrows 38.

Fluid 32 flowing through the primary filter deflector screen 14 encounters the secondary filter deflector screen 16. Most of that fluid flows through the secondary filter deflector screen as indicated by the arrows 40. A portion of that fluid 42 flows downward along the secondary filter deflector screen 16 and through the gap between the downward and forward extending portion 26 of the baffle 20 as indicated by the arrows 44. The fluid 38 and 44 flowing downward along the walls of the cone abruptly turns upward and flows through openings 28 as shown by arrows 50. That fluid returns to the secondary filter deflector screen for further removal of any remaining fine particles of rust or scale or other foreign materials. The fluid flowing in the direction of arrows 50 is effected by fluid flowing in the direction of arrows 52 through openings 54 in portion 18 of the primary filter deflector screen baffle. The flow of water indicated by the arrows 52 tends to equalize forces on the deflector screens and baffle portion.

When the rust trapping eddy chamber 12 is filled with particles, the emptying means, which is a wing screw 60, may be removed. Wing screw 60 is removed when the engine is turned off. The gravitational flow of water downward along the conical wall 8 of the collection chamber 12 as encouraged by the baffle 20 aides in removing all of the trapped particles from the collection chamber when the emptying means 60 is removed.

The body 2 has an upward extension 62 which is surrounded by a flange 64. Bolts 66 are permanently mounted in the flange and nuts 68 connect a cover plate 70 to flange 64. A gasket 72 seals the flange.

In one embodiment of the invention, the primary and secondary filter deflection screens are held in place by opposite parallel channels extending downward and forward along the walls of the conical body. Baffle portion 20 is freely supported between the collection chamber 12 and the separation chamber 10. Alternatively, the baffle 20 may have side projections which fit in complementary recesses in cylindrical wall 8.

In a preferred embodiment the primary filter deflector screen and the baffle are embedded in the material which forms the body 2.

Alternatively, the primary and secondary filter deflector screens may be permanently attached to the cover plate 70 so that the screens are removed when the cover plate is removed.

The invention solves the problem of keeping filter screens clean by providing filter and deflector screens to control flow of water along the filter and deflector screens and in a rust trapping eddy chamber, to create eddys and to return the flow of fluid to the secondary deflector, while balancing forces on the eddy-creating and positioning deflectors.

While the invention has been described with reference to specific embodiments, modifications and variations of the invention may be constructed without departing from the scope of the invention which is defined in the following claims.

I claim:

1. Rust and scale arrester apparatus for installing in a circulating cooling system for internal combustion engines comprising a fluid inlet and a fluid outlet, a separation chamber positioned between the fluid inlet and the fluid outlet, a collection chamber connected below the separation chamber in fluid communication therewith, deflecting filter means disposed in the separation chamber between the fluid inlet and the fluid outlet for separating solids from the fluid flowing through the separation chamber from the inlet to the outlet and baffle means mounted in the separation chamber and in the collection chamber for directing flow of fluid through the separation chamber and through the collection chamber to promote removal of solid particles from the deflecting filter means and to flow solid particles from the deflecting filter means into the collection chamber, and emptying means connected to the collection chamber for emptying solid particles in the collection chamber, the baffle means extending rearward in the direction of the fluid inlet and downward in the direction of the collection chamber from the filter means, a portion of the baffle means extending forward in the direction of the outlet and downward from a downward and rearward extending portion of the baffle means, and the downward and forward extending portion of the baffle means having openings therein for permitting upward flow of fluid from the collection chamber toward the separation chamber.

2. The rust and scale arrester of claim 1 wherein the filter means extends downward in a direction of the collection chamber and forward in a direction of the outlet means.

3. The rust and scale arrester apparatus of claim 2 wherein the deflecting filter means comprise parallel downward and forward sloping foraminous filter barriers.

4. The rust and scale arrester apparatus of claim 3 in which a first filter means adjacent the inlet has relatively large openings and in which a second filter means adjacent the outlet has relatively small openings whereby fluid flowing through the first filter means tends to flow through the second filter means and also downward and forward along the second filter means thereby flowing solid particles downward toward the collection chamber.

5. The apparatus of claim 4 wherein the second filter means extends across the separation chamber, separating the separation chamber from the outlet means.

6. The apparatus of claim 3 wherein the filtering means slope forwardly at approximately 60°.

7. The apparatus of claim 1 wherein the baffle means extending into the collection chamber create and eddy floe which encourages the accumulation of rust and scale and other foreign matter at the bottom of the separation chamber.

8. The apparatus of claim 7 wherein the baffle means extending into the collection chamber create an eddy flow which encourages the accumulation of rust and scale and other foreign matter at the bottom of the separation chamber.

9. The rust and scale arrester apparatus of claim 1 wherein the baffle means is connected to the deflecting filter means and extends from the deflecting filter means into the collection chamber.

10. The rust and scale arrester apparatus of claim 1 wherein the downward and rearward extending portion of the baffle means has openings therein for flowing fluid through the openings from an inlet direction across the downward and forward extending portion of the baffle means.

11. The rust and scale arrester apparatus of claim 1 wherein the inlet and outlet means are generally tubular and are axially aligned and wherein the collection chamber comprises a conical chamber sloping downward and inward therefrom and wherein the apparatus further comprises an upward extension opposite the collection chamber and an outward extending flange surrounding the extension and a mounting plate covering the flange and sealing the apparatus whereby removing the mounting plate provides access to the filter means and baffle means.

* * * * *